June 7, 1966  W. E. LOSEY  3,254,609
REVERSING LOOP FOR POWER AND FREE CONVEYORS
Filed July 15, 1964  4 Sheets-Sheet 1
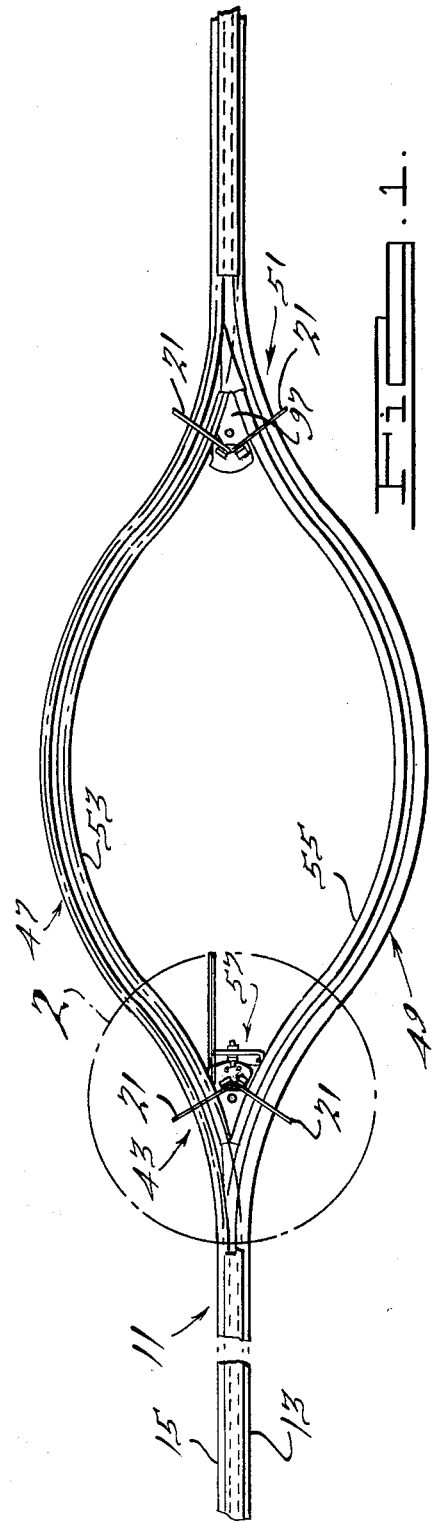
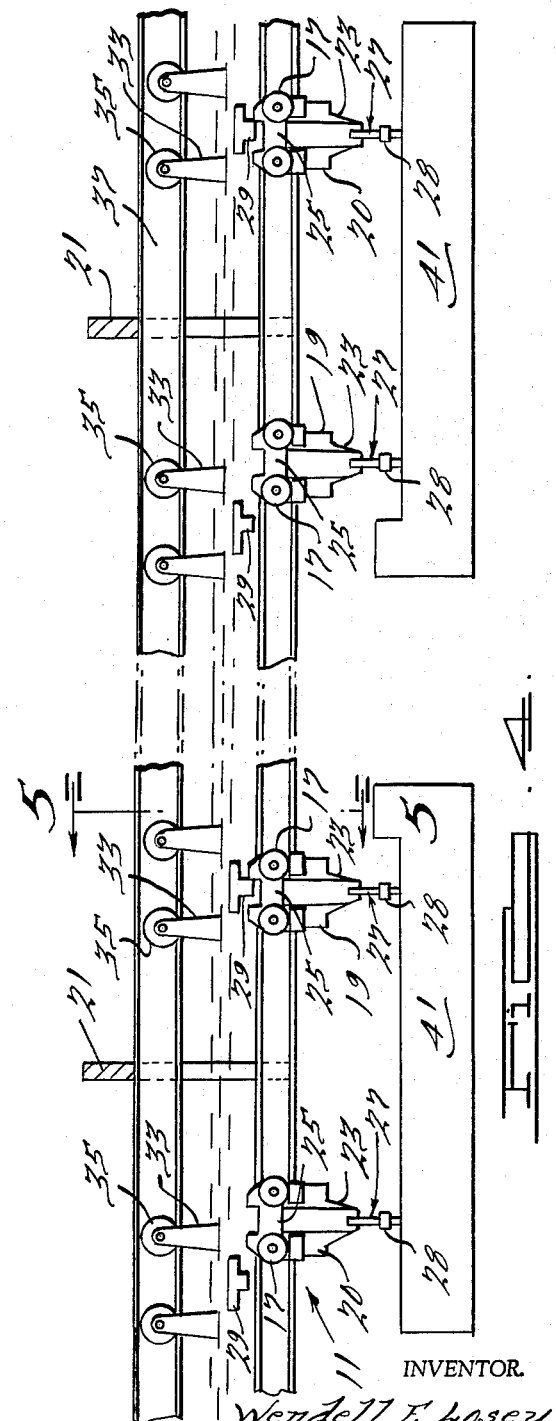
INVENTOR.
Wendell E. Losey
BY
Carnes, Dickey & Pierce
ATTORNEYS June 7, 1966   W. E. LOSEY   3,254,609
REVERSING LOOP FOR POWER AND FREE CONVEYORS
Filed July 15, 1964   4 Sheets-Sheet 2
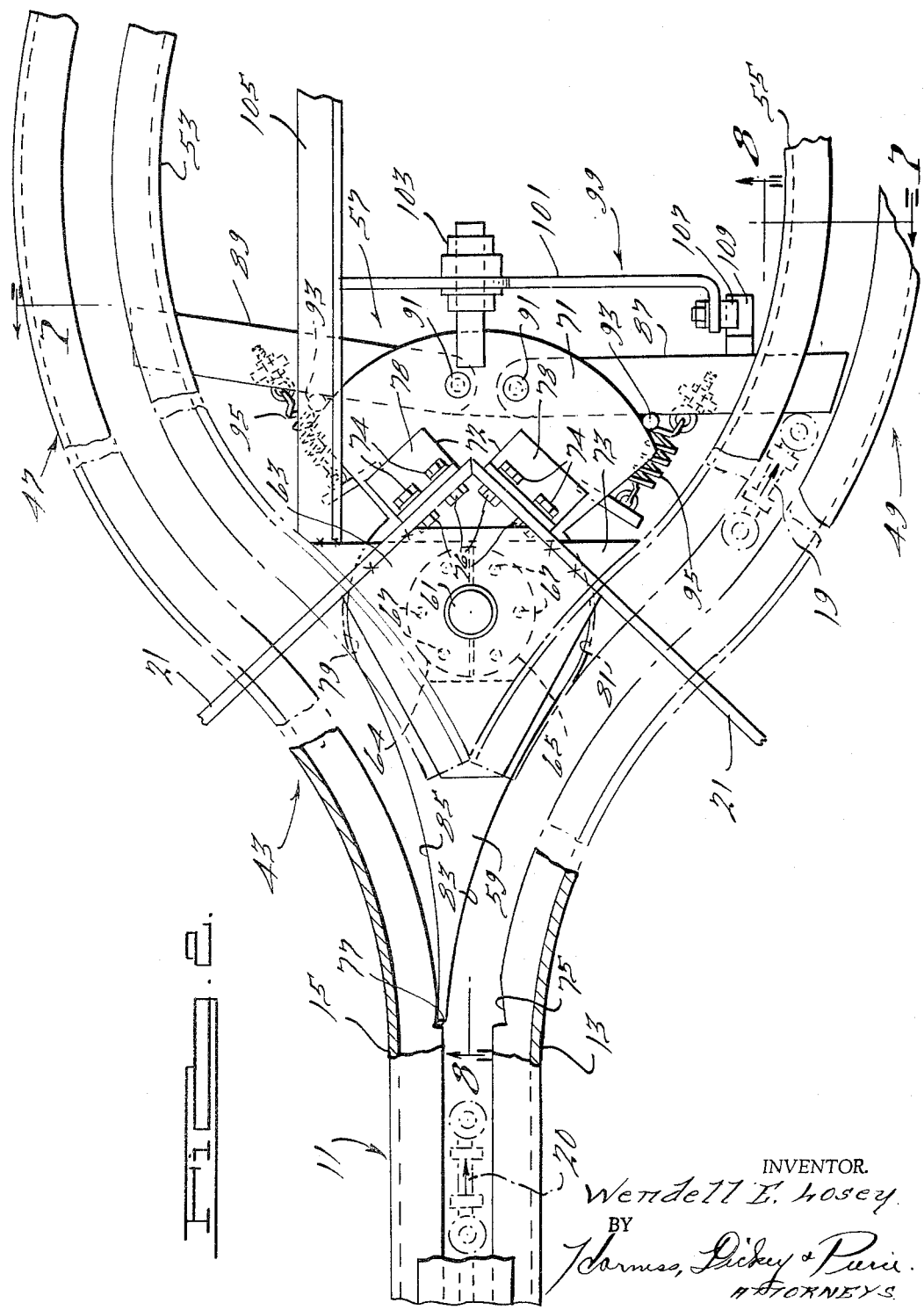
INVENTOR.
Wendell E. Losey
BY
Carness, Dickey & Pierce
ATTORNEYS

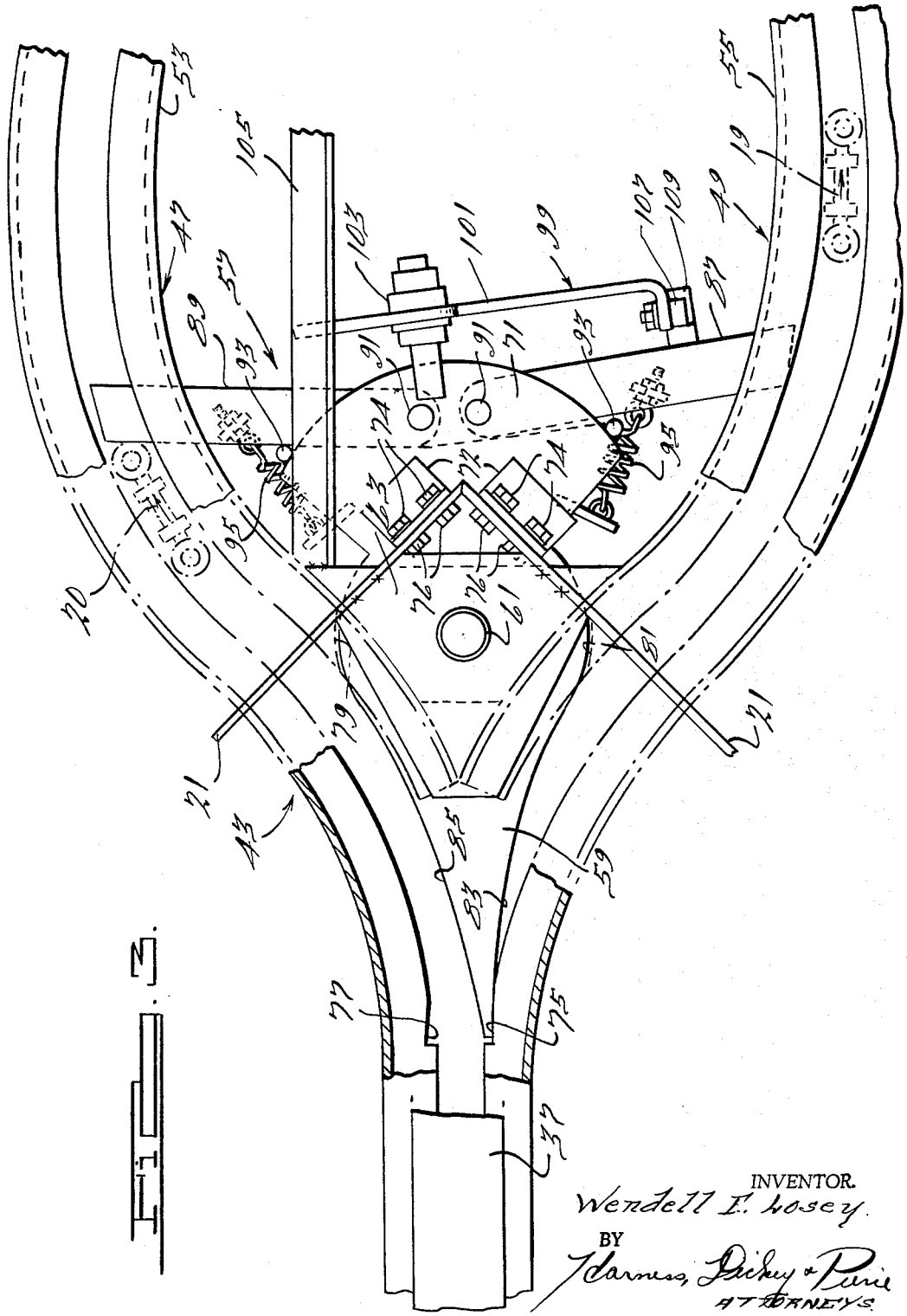

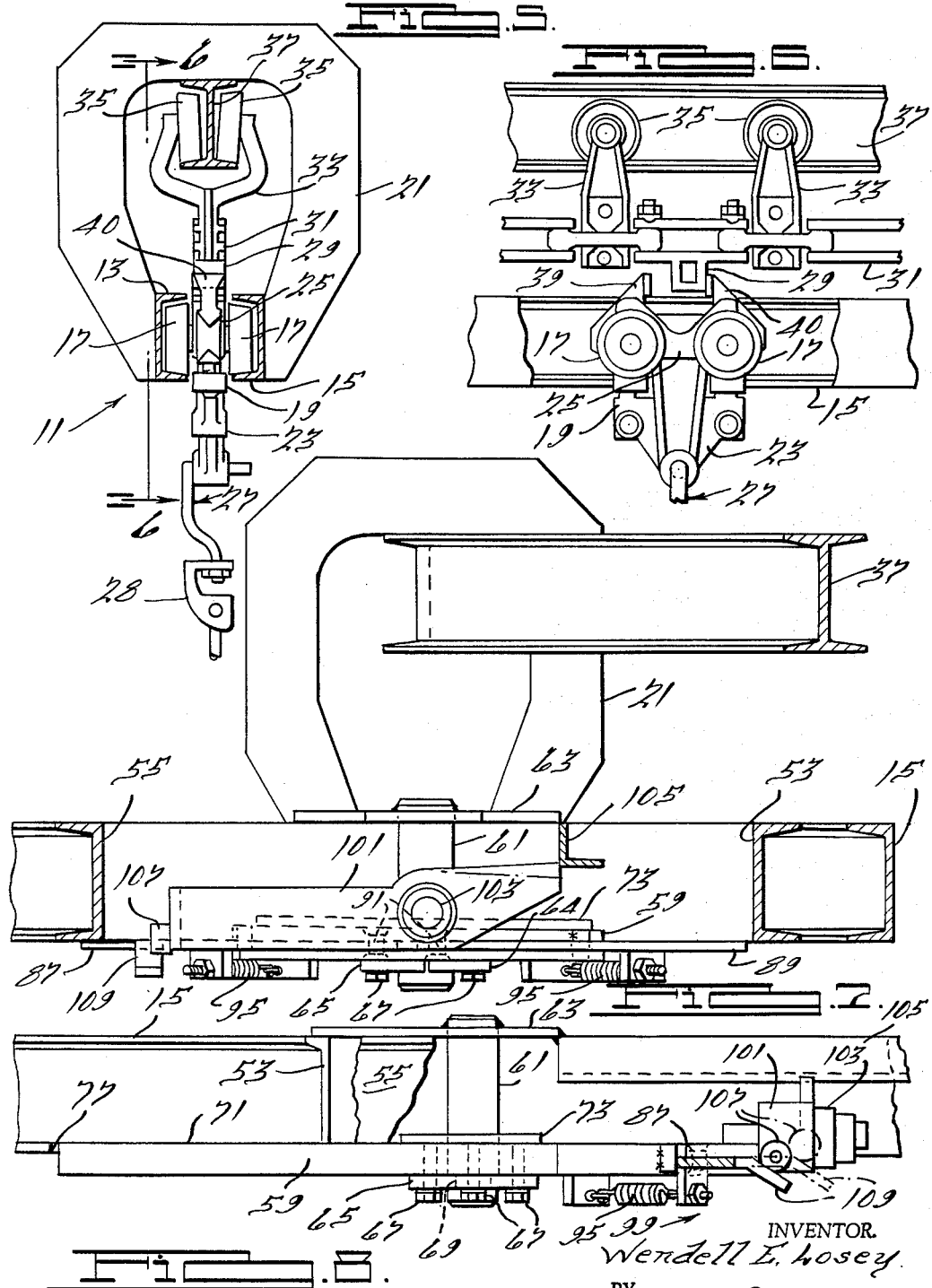

United States Patent Office 3,254,609
Patented June 7, 1966

1

3,254,609
REVERSING LOOP FOR POWER AND FREE CONVEYORS
Wendell E. Losey, Linden, Mich., assignor to Anchor Steel and Conveyor Company, Dearborn, Mich., a corporation of Michigan
Filed July 15, 1964, Ser. No. 382,780
12 Claims. (Cl. 104—172)

This invention relates generally to conveyors and specifically to a directional reversing loop and associated switching device for a power-and-free conveyor.

Power-and-free conveyors conventionally include an over-head track arrangement adapted to support and guide a series of wheeled trolleys for movement therealong. A power driven chain above the trolley track is equipped with drive lugs which novelly engage selected ones of the trolleys to move them along the track; however, if desired, the drive chain can be spaced farther from the track or moved to one side thereof to disengage the chain from the trolleys. Each of the trolleys may be provided with a work supporting device suspended therefrom so that workpieces supported from the trolleys are carried therewith as the trolleys move along the track or, alternatively, work supporting trays can be suspended from adjacent pairs of trolleys. The present invention contemplates the latter type of work supporting arrangement and provides means for reversing workpieces on the trays automatically end-for-end as they move along the conveyor. A typical need to reverse workpieces on the conveyor arises, for example, where the conveyor is used to convey large articles past workmen whose job it is to perform some operation on or inspect the articles. For convenience, safety or sometimes to save space, it is desirable to perform the desired operation or inspection on both sides of the workpieces all from one side of the conveyor. In these instances, the workpieces will be delivered first for operation on one side. The workpieces are then reversed, end-for-end so that the operation or inspection may then be performed on the other side.

One example of a plant installaiton where a power-and-free reversing conveyor of this type will find use is an auto body paint and assembly plant. Thus, by reversing the auto body, end-for-end, both sides thereof may be painted from one side of the conveyor rather than by workmen standing on opposite sides of the conveyor directing the paint toward each other. Also, conveyors of the type here under consideration frequently are installed adjacent a building wall or other obstruction that makes it inconvenient or even impossible to station workmen at opposite sides of the conveyor and this requires that the work be reversed in order to paint or to perform work or assembly operations on opposite sides thereof.

Briefly, then, in the trolley and track conveyor arrangement of the present invention, the drive chain is suspended from wheeled carriers riding on a track positioned closely adjacent and extending generally parallel to the conveyor trolley track. This drive chain may be provided with spaced lugs or the like adapted to drivingly engage a portion of an adjacent trolley. Each of the workpieces is supported by at least two trolley assemblies, and at least one of the trolleys supporting each workpiece will be in driving engagement with the drive chain during workpiece movement.

The trolley and drive chain tracks are designed to extend adjacent and generally parallel to each other throuhghout their lengths as elicited above. However, the trolley track is provided with a reversing loop or branch which diverges away from and converges back to

2 the main trolley track in a region where the end-for-end workpiece reversing is to take place. The drive chain will follow only the main trolley track by-passing the loop branch thereby being disengaged from any trolley following the loop branch. Thus, by directing the leading trolley of each workpiece supporting pair into the loop branch and the following trolley into the main trolley track in the vicinity of the loop branch, the leading trolley will be caused to idle with the following trolley being powered by the drive chain. The loop branch is spaced laterally from the main track portion a distance equal to the normal spacing between the trolleys of each workpiece supporting pair. The trailing trolley will continue movement until it overtakes and passes the other trolley and now becomes the leading trolley. When this happens, the idle trolley will be pulled along the loop branch which converges back to the main track. The workpiece will therefore be reversed, end-for-end without disengagement of any of the trolleys from the track.

To achieve the necessary alternate directional guiding of the trolleys at the point of loop branch divergence, a novel directional switching device which is the subject of the present invention is provided. This device is calculated to both direct the leading and trailing trolleys to the proper track portions as well as to provide support for these trolleys at this diverging branching point. Additionally, this switch is designed for substantially automatic and foolproof operation in direct response to trolley movement and includes a minimum of moving parts to minimize cost and virtually eliminate the chance of malfunctioning or failure.

It is, therefore, an object of the present invention to provide an improved reversing loop assembly for a power-and-free conveyor adapted to reversing workpieces fed therealong end-for-end.

A further object of the present invention is to provide an improved reversing loop assembly for a conveyor of the above character having a novel directional switching device for the reversing loop.

A further object of the present invention is to provide an improved conveyor reversing loop assembly of the above character wherein the switching device is effective to direct selected work-carrying trolleys to alternate sides of the loop.

A further object of the present invention is to provide an improved conveyor reversing loop assembly of the above character wherein the switching device is actuated automatically and in direct response to trolley movement.

A further object of the present invention is to provide an improved conveyor reversing loop assembly of the above character which is virtually foolproof in operation.

A still further object of the present invention is to provide an improved conveyor reversing loop assembly of the above character which is relatively inexpensive to manufacture, rugged in construction and reliable in use.

Further objects and advantages of the present invention will become more apparent from the following detailed description taken in conjunction with the drawings in which:

FIGURE 1 is a plan view of a conveyor reversing loop track assembly for a power-and-free type conveyor with the supporting frame structure removed for clarity, having associated therewith a directional switching arrangement constructed according to the principles of the present invention;

FIG. 2 is an enlarged view of a portion of the structure of FIG. 1 taken within the circle 2 and showing the directional switch in one of its positions;

FIG. 3 is a view similar to FIG. 2 but with the directional switch in the other of its positions;

FIG. 4 is an elevational view showing the power and conveyor trolley drive assembly before and after the workpiece has been reversed in the conveyor loop;

FIG. 5 is a sectional view of the structure of FIG. 4 taken along the line 5—5 thereof;

FIG. 6 is a sectional view of the structure of FIG. 5 taken along the line 6—6 thereof;

FIG. 7 is a sectional view of the structure of FIG. 2 taken along the line 7—7 thereof with some of the supporting structure removed for clarity; and FIG. 8 is a sectional view of the structure of FIG. 2 taken substantially along the line 8—8 thereof partly broken away and with some of the supporting structure removed for clarity.

Referring now more specifically to the drawings, a trolley conveyor assembly adapted for use with a device constructed according to the principles of the present invention is seen to include a trolley track generally indicated at 11 which may extend substantially continuously throughout a plant or factory as desired. The track may be formed by a spaced pair of opposed channel ways 13 and 15 in which a plurality of conventional ball bearing wheels 17 of a trolley assembly 19 will ride. (See FIG. 5.) The channels 13 and 15 are adapted to be suspended by a plurality of C-shaped yokes 21 to which they are welded or otherwise suitably attached.

The trolleys 19 are generally of the type having a downwardly depending portion 23 rigidly supported by a body member 25 upon which the wheels 17 are mounted for free rotation. A suitable work supporting hook, clamp or platform 27 having a conventional horizontal swivel connection 28 is carried by the portion 23 in the usual manner.

The trolleys 19 are adapted to be engaged and driven along the channel ways 13 and 15 by spaced driving lugs 29 suitably disposed on a drive chain 31. As shown in FIGS. 5 and 6, the drive chain 31 is suspended from a plurality of spaced carriers 33, each of which is provided with a pair of freely rotatable wheels 35 adapted to ride along an I-beam 37 rigidly suspended from suitable overhead frame structure (not shown). As shown, the I-beam is fixed to and supports each of the yokes 21 as by welding and is disposed above and generally parallel to the channel ways 13 and 15. The drive lugs 29 are adapted to be received between a pair of spaced dogs 39 and 40 carried at the upper portion of each of the trolleys 19. The dogs 39 and 40 are each pivotally disposed about horizontal pivot pins (not shown) upon the trolley body 25 for movement of their upper portions toward each other to permit one of the drive lugs 29 positioned outside the dogs 39 and 40 to cam over and move to a position between the dogs. The position of the dogs 39 and 40 illustrated in FIG. 6 depicts the limit of movement of the upper portions thereof away from each other which is the normal dog position.

In use, the lug 29 will cam over the dog 39 and engage the vertical face of dog 40 as shown in FIG. 6. Since the top portion of the dogs 39 and 40 cannot pivot away from each other, the trolley 19 will be caused to move along the channel ways 13 and 15 with movement of the drive chain 31 along the I-beam track 37. However, by spreading or diverging the tracks formed by the I-beam 37 and the ways 13 and 15, the driving lugs 29 will be withdrawn laterally from between the dogs 39 and 40 and driving movement of the trolly 19 will cease.

In the power-and-free conveyor incorporating the principles of the present invention, two spaced trolleys are used to support and carry each of the workpieces. Thus, as shown in FIG. 4, a pair of identical trolleys 19 and 20 and their work supporting devices 27 form spaced supports for a workpiece or workpiece platform shown schematically at 41. It is significant that only the leading trolley is normally drivingly engaged by a lug 29 on the drive chain 31, a succeeding lug 29 being spaced from the first lug 29 a distance greater than the distance between the two trolleys 19 and 20. In order to reverse the workpieces 41, end-for-end, the trolleys 19 and 20 of each pair must also be reversed. To this end, the reversing loop and switch structure of the present invention are provided.

As illustrated in FIG. 1, the trolley track 11 is designed to divide or diverge at a region indicated generally at 43 to form a loop portion which includes a main track portion 47 and a loop branch 49. This main track and loop branch 47 and 49 will reconverge at a region indicated generally at 51 at which is located downstream of the junction region 43 in the normal direction of trolley movement. Each of the main track and loop branch portions 47 and 49 may include a pair of opposed channel ways similar to the ways 13 and 15 which are adapted to receive and guide the trolleys through either side of the reversing loop. Thus, as shown more clearly in FIGS. 2 and 3, the channel way 15 of the track 11 may be extended to form one of the channel ways of the main track portion 47. Similarly, the channel way 13 may form one of the channel ways of the loop branch portion 49. The other of the two channel ways of the portions 47 and 49 are shown at 53 and 55 and each is of substantially the same cross-section as the ways 13 and 15 and are, throughout their length, equidistant from the ways 15 and 13, respectively. As in the case of the track portion 11 above, the main track and loop branch portions 47 and 49, respectively, are supported by suitable spaced yokes 21.

As shown in FIGS. 2 and 3, the channel ways 53 and 55 terminate short of the juncture point 43. To bridge the gap at this juncture 43 and permit the trolleys 19 and 20 to be delivered to the desired one of the main track or branch loops, a novel directional switching device is provided shown generally at 57 in FIGS. 1–3. This switch is seen to include a contoured elongate blade portion 59 pivotally disposed upon a pin 61. A structural plate 63 may be suitably fixed to the pin 61 and to adjacent ones of the yokes 21 as, for example, by welding. A pair of half washers 64 and 65 may be removably attached to the lower surface of the blade 59 as by screws 67. These half washers 64 and 65 are adapted to be freely received within an annular groove 69 formed adjacent the lower end of the pin 61, thereby suspending the blade 59 from the pin 61 and permitting pivotal movement relative thereto.

The blade 59 has an upper surface 71 adapted to abut a bearing plate 73 which may, in turn, be welded at its edges to the channel members 53 and 55. To further stabilize the blade 59, a pair of angled brackets 72 are adjustably mounted for vertical movement on a pair of the yokes 21 as by suitable bolts 74 and nuts 76 and each of the brackets 72 has a foot portion 78 adapted to smoothly engage the surface 71 of the blade. Additionally, this surface 71 is positioned substantially coplanar with the lower arms of each of the channels 13, 15, 53 and 55 in order that the trolley wheels 17 may ride smoothly thereover. Each of the channels 13 and 15 has its lower arm notched as at 75 and 77, respectively, to receive the end portion of the blade 59 and limit the pivotal movement thereof. The channels 53 and 55 also have a portion of their lower arms removed back to 79 and 81 to accommodate the blade 59 in its pivotal movement.

FIGS. 2 and 3 illustrate the limits of the pivotal movement of the blade 59. As shown therein, the blade contour is such that a longitudinal side edge 83 thereof will be substantially equidistant throughout its length from the channel 13 when the blade is in the FIG. 2 position and will form a bridge between the channels 13 and 55, respectively. Thus, a trolley approaching the juncture 43 when the blade is in the FIG. 2 position will be directed into the loop branch 49 as the trolley wheels 17 ride upon the blade top surface 71 and within the channel 13.

Similarly, the blade 59 is formed with a second longitudinal side edge 85 so that when the blade is in the FIG. 3 position, an approaching trolley will be directed into the main track branch 47 by the trolley wheels 17 riding along the blade top 71 and within the channel 15.

The blade 59 is adapted to be moved to the FIG. 2 or FIG. 3 position, automatically and according to a predetermined sequence according to various trolley positions. Thus, the blade 59 is provided with a pair of outwardly extending arms 87 and 89 pivotally attached thereto by pins 91. Each of the arms 87 and 89 is adapted to engage an abutment pin 93 fixed to the blade 59 and each is normally maintained thereagainst by a relatively strong tension spring 95. The arms 87 and 89 are adapted to ride closely along the undersurface of the channels 55 and 53, respectively. As shown, the arm 87 will extend into the path of a trolley moving in the loop branch 49 when the blade 59 is in the FIG. 2 position with the arm 89 removed inwardly from the main track branch 47. Conversely, when the blade 59 is in the FIG. 3 position, the arm 87 will be removed inwardly from the loop branch 49 and the arm 89 will extend into the path of a trolley moving in the main track branch 47. The blade 59 will therefore be moved from the FIG. 2 position to the FIG. 3 position by a trolley moving along the loop branch 49 which will engage the arm 87 and pivot the blade 59 about the pin 61, the relatively strong tension spring 95 maintaining a substantially rigid connection between the blade 59 and the arm 87. Similarly, when the blade 59 is in the FIG. 3 position, a trolley moving in the main track 47 will engage the arm 89 and pivot the blade to the FIG. 2 position. If any rough edges or burrs be formed on the trolleys, the springs 95 will permit pivotal movement of the arms 87 and 89 so that the trolley may pass freely thereby.

As was stated hereinabove, the spaced trolleys 19 and 20 which support the workpieces are reversed to reverse the workpieces end-for-end. This is accomplished by directing the leading trolley 19 of each workpiece supporting pair into the loop branch 49 and the trailing trolley 20 into the main track 47. Since the power chain 31 follows only the main track 47, the leading trolley 19 directed to the loop branch 49 will be disengaged from the power chain by the lug 29 moving out between the dogs 39 and 40 thereof and will no longer be driven directly thereby. The succeeding lug 29 on the power chain 31 will, however, be received between the dogs 39 and 40 of the following trolley 20 and direct it through the main track 47. This drive connection will continue with the trolley 20 eventually passing the original leading trolley. As the trolleys emerge from the reversing loop, their positions will have been reversed and the workpiece supported thereby reversed end-for-end through the horizontal siwivel connections 28.

The switch assembly 57 is designed to accomplish this reversing operation and initially is positioned as shown in FIG. 2. The leading trolley 19 is engaged by the lug 29 of the power chain 31 as shown in FIG. 6 and will be directed into the loop branch 49. As this happens, the lug 29 will move out of engagement with the dog 40 and the trolley 19 and workpiece will momentarily come to a halt short of the arm 87. The power chain 31 will continue moving with the succeeding lug 29 bumping over the dog 39 and engaging the dog 40 of the following trolley 20. Thereafter, the leading trolley 19 is pushed along the loop branch 49 and the following trolley 20 is power driven toward the junction 43. At this point, the leading trolley 19 will engage the arm 87 and will pivot the blade 59 to the position shown in FIG. 3 before the trolley 20 reaches the juncture 43. The trolley 20 will, therefore, be directed to the main track 47 while maintaining its drive connection with the power chain lug 29.

The width of the loop, i.e., the lateral distance between the main track 47 and the loop branch 49 is designed substantially equal to the spacing between the trolleys 19 and 20 while the distance between the blade arms 87 and 89 to the leading edge of the blade 59 is somewhat less than the spacing between the trolleys 19 and 20. Consequently, after the trolley 19 has passed the arm 87, the trolley 20 will move into and along the main track 47 and will engage the arm 89 to pivot the blade 59 back to the FIG. 2 position. The trolley 20 will continue moving and will be caused to pass the trolley 19 at some lateral midpoint of the reversing loop to now become the leading trolley. As the trolleys emerge from the reversing loop, their positions will have been reversed and the workpiece reversed end-for-end as shown in the right-hand portion of FIG. 4.

The juncture 51 for the reversing loop is formed generally the same as the juncture 43 and has a bladed switch member 97 formed generally the same as the blade 59 to guide the trolleys therepast. However, the blade 97 is freely pivoted relative to the conveyor frame and is adapted to be cammed pivotally back and forth to support the trolleys emerging from the main track and loop branches 47 and 49, respectively, simply by the trolleys 19 and 20 engaging the contoured side edges thereof.

To insure that the blade 59 when moved to the FIG. 2 position will not be inadvertently moved out of this position until the trolley 19 is moved into the loop branch 49, a novel latching device is provided and is indicated generally at 99. This latch is seen to include a lever 101 pivotally mounted at an intermediate point on the blade 59 by a pivot pin assembly 103. One end of the lever 101 is adapted to engage a fixed abutment 105 suitably fixed to the plate 73 as by welding. The other end of the lever 101 carries a freely rotatable roller 107 adapted for engagement with a ramp member 109 suitably fixed to the arm 87. The lever 101 is preferably designed so that the end carrying the roller 107 is heavier than the end adapted to engage the abutment 105. Thus, when the blade 59 is in the FIG. 2 position, the weight of the lever 101 will cause the roller 107 to bear against the ramp 109 with the other end of the lever 101 engaging the abutment 105. However, when the trolley 19 engages the arm 87, this arm will pivot slightly in a counterclockwise direction relative to the blade 59 since the lever 101 engaging the abutment 105 keeps the blade 59 from pivoting. This will cause the ramp 109 to move relative to and lift the roller 107 thereby pivoting the lever 101 about its pivot pin 103 in a clockwise direction as viewed in FIG. 7. The lever short end will then swing under the abutment 105 and the blade 59 can move to the position shown in FIG. 3. When the blade moves back to the FIG. 2 position, the lever 101 weight will insure repositioning thereof in engagement with the abutment 105.

The present invention therefore provides a simple but effective trolley reversing loop switching device which is relatively incapable of malfunctioning and is operable directly by the conveyor trolleys.

While a preferred embodiment of the present invention has been illustrated and described above, various additions, modifications, substitutions and omissions may be made thereto without departing from the spirit of the invention as encompassed by the appended claims.

What is claimed is:
1. A conveyor assembly including
   at least two spaced work carrying devices adapted to pivotally support a workpiece and to be moved along an elongate track,
   drive means positioned adjacent said track and adapted to engage at least one of said work carrying devices,
   at least one branched track loop diverging away from and converging to said track,
   means movable in response to the position of one of said work carrying devices for directing the other of said work carrying devices to one of said track or branched track loop, a first leading one of said work carrying devices moving into one of said track and track loop and causing said movable means to direct a second trailing one of said work carrying devices along the other of said track and track loop, said second work carrying device being engaged by said drive means when said first work carrying device is in one of said track and track loop, said track loop being spaced from said track a distance allowing said second work carrying device to overrun said first work carrying device.

2. A conveyor assembly including at least two spaced trolleys adapted to pivotally support a workpiece and to be moved along an elongate track, drive means positioned adjacent said track and adapted to engage at least one of said trolleys, at least one branched track loop diverging away from and converging to said track, means movable in response to one of said trolleys being positioned in one of said track or track branch for directing the other of said trolleys to the other of said track or branched track loop, a first leading one of said trolleys moving into one of said track and loop and causing said movable means to direct a second trailing one of said trolleys along the other of said track and loop, said drive means engaging said second trolley when said first trolley is in one of said track and loop, said loop being spaced from said track a distance allowing said second trolley to overrun said first trolley.

3. A conveyor assembly including at least two spaced work carrying devices adapted to pivotally support a workpiece and to be moved along an elongate track, drive means positioned adjacent said track and adapted to engage at least one of said work carrying devices, at least one branched track loop diverging away from and converging to said track, switch means positioned at said point of divergence between said track and track branch and movable in response to the position of one of said work carrying devices for directing the other of said work carrying devices to one of said track or branched track loop, a first leading one of said work carrying devices moving into said loop and causing said switch means to direct a second trailing one of said work carrying devices along said track, said drive means engaging said second work carrying device when said first work carrying device is in said loop, said loop being spaced from said track a distance allowing said second work carrying device to overrun said first work carrying device.

4. A conveyor assembly including at least two spaced trolleys adapted to pivotally support a workpiece and to be moved along an elongate track in a predetermined direction, drive means positioned adjacent said track and adapted to engage one of said trolleys, a track loop joined to said track at its end portions and having an intermediate portion spaced from said track, switching means positioned at the upstream juncture point between said track and track loop relative to said direction of trolley movement adapted to selectively guide an approaching trolley for movement along said track or track loop, said switching means being pivotally movable in response to the positioning of another trolley in said track or track loop, whereby the first leading of said two trolleys will be directed into said track loop and cause said switching means to pivot and direct the second of said two trolleys into said track.

said drive means engaging said second trolley when said first trolley is in said loop, said loop intermediate portion being spaced from said track a distance allowing said second trolley to overrun said first trolley.

5. A conveyor assembly including at least two spaced trolleys adapted to pivotally support a workpiece and to be moved along an elongate track in a predetermined direction, drive means positioned adjacent said track and adapted to engage the leading one of said trolleys, a track loop joined to said track at its end portions and having an intermediate portion spaced from said track, switching means positioned at the upstream juncture point between said track and track loop relative to said direction of trolley movement adapted to guide said leading trolley for movement along said track loop and disengage said drive means therefrom, said switching means being pivotally movable in response to the positioning of said leading trolley in said track loop to cause the trailing one of said trolleys to be directed into said track, said drive means engaging said trailing trolley when said leading trolley is in said loop, said loop intermediate portion being spaced from said track a distance allowing said trailing trolley to overrun said leading trolley.

6. A conveyor assembly including at least two spaced trolleys adapted to pivotally support a workpiece and to be moved along an elongate track in a predetermined direction, drive means positioned adjacent said track and having means spaced apart a distance greater than said trolleys adapted to engage said trolleys, the leading one of said last-mentioned means normally engaging the leading one of said trolleys, a track loop joined to said track at its end portions and having an intermediate portion spaced from said track, switching means positioned at the upstream juncture point between said track and track loop relative to said direction of trolley movement adapted to guide said leading trolley for movement along said track loop whereupon the trailing one of said spaced drive means will engage said trailing one of said trolleys, said switching means being pivotally movable in response to the positioning of said leading trolley in said track loop and causing the trailing one of said trolleys to be directed into said track, said loop intermediate portion being spaced from said track a distance allowing said trailing trolley to overrun said leading trolley.

7. A conveyor assembly including at least two trolleys adapted to support a workpiece and to be moved along an elongate track in a predetermined direction, drive means positioned adjacent said track and adapted to engage one of said trolleys, a track loop joined to said track at its end portions and having an intermediate portion spaced from said track a distance substantially equal to the spacing between said trolleys, switching means positioned at the upstream juncture point between said track and track loop relative to said direction of trolley movement adapted to selectively guide an approaching trolley for movement along said track or track loop, said switching means being pivotally movable in response to the positioning of another trolley in said track or track loop,
whereby the first of said two trolleys will be directed into said track loop and the second of said two trolleys will be directed into said track,
the second of said trolleys being permitted to overrun said first trolley.

8. A conveyor assembly including
at least two spaced trolleys adapted to pivotally support a workpiece and to be moved along an elongate track in a predetermined direction,
drive means positioned adjacent said track and adapted to engage at least one of said trolleys in said track,
a track loop joined to said track at its end portion and having an intermediate portion spaced from said track,
switch means having a spaced pair of arms mounted adjacent the juncture point between said track and track loop,
said switch means being pivotally mounted for movement from a first position where a one of said arms is across said track loop to a second position where the other of said arms is across said track,
said switch means when in said first position being adapted to direct a trolley along said track loop and when in said second position being adapted to direct a trolley along said track,
a first leading one of said trolleys when moved into said track loop engaging said one arm and pivoting said switch to its second position and a second trailing one of said trolleys when moved into said track after said first trolley is in said loop being engaged by said drive means and engaging said other arm and pivoting said switch to its first position,
the spacing between said track loop intermediate portion and said track allowing said second trolley to overrun said first trolley.

9. A conveyor assembly including
at least two spaced trolleys adapted to pivotally support a workpiece and to be moved along an elongate track in a predetermined direction,
drive means positioned adjacent said track and adapted to engage at least one of said trolleys in said track,
a track loop joined to said track at its end portions and having an intermediate portion spaced from said track,
switch means having a spaced pair of arms mounted adjacent the upstream juncture point between said track and track loop,
said switch means being pivotally mounted for movement from a first position where a one of said arms is across said track loop to a second position where the other of said arms is across said track,
said switch means when in said first position being adapted to direct a trolley along said track loop and when in said second position being adapted to direct a trolley along said track,
a first leading one of said trolleys when moved into said track loop engaging said one arm and pivoting said switch to its second position and second trailing one of said trolleys when moved into said track after said first trolley is in said loop being engaged by said drive means and engaging said other arm and pivoting said switch to its first position,
the spacing between said track loop intermediate portion and said track allowing said second trolley to overrun said first trolley,
and means adapted to maintain said switch against inadvertent movement when in said first position,
said last-mentioned means being releasable upon engagement between said first trolley and said one arm.

10. A conveyor assembly including
at least two spaced trolleys adapted to pivotally support a workpiece and to be moved along an elongate track in a predetermined direction,
drive means positioned adjacent said track and adapted to engage at least one of said trolleys in said track,
a track loop joined to said track at its end portions and having an intermediate portion spaced from said track,
switch means having a spaced pair of arms mounted adjacent the upstream juncture point between said track and track loop,
resilient means normally maintaining each of said arms in a first position relative to said switch,
said switch means being pivotally mounted for movement from a first position where a one of said arms is across said track loop to a second position where the other of said arms is across said track,
said switch means when in said first position being adapted to direct a trolley along said track loop and when in said second position being adapted to direct a trolley along said track,
a first leading one of said trolleys when moved into said track loop engaging said one arm and pivoting said switch to its second positon and second trailing one of said trolleys when moved into said track after said first trolley is in said loop being engaged by said drive means and engaging said other arm and pivoting said switch to its first position,
the spacing between said track loop intermediate portion and said track allowing said second trolley to overrun said first trolley.

11. A conveyor assembly including
at least two spaced trolleys adapted to pivotally support a workpiece and to be moved along an elongate track in a predetermined direction,
drive means positioned adjacent said track and adapted to engage at least one of said trolleys in said track,
a track loop joined to said track at its end portions and having an intermediate portion spaced from said track,
switch means movably mounted adjacent the upstream juncture between said track and track loop for movement from a first position where an approaching trolley will be directed to said track loop and a second position where an approaching trolley will be directed into said track,
said switch means including means for supporting said trolleys during passage through said upstream juncture point and being movable from said first to said second positions in response to positioning of a trolley in said track loop,
a first leading one of said trolleys moving into one of said track and loop and causing a second trailing one of said trolleys to move along the other of said track and loop,
said drive means engaging said second trolley when said first trolley is in one of said track and loop,
said loop intermediate portion being spaced from said track a distance allowing said second trolley to overrun said first trolley.

12. A conveyor assembly including
at least two spaced trolleys adapted to pivotally support a workpiece and to be moved along an elongate track in a predetermined direction,
drive means positioned adjacent said track and adapted to engage at least one of said trolleys in said track,
a track loop joined to said track at its end portions and having an intermediate portion spaced from said track,
first switch means movably mounted adjacent the upstream juncture between said track and track loop for movement from a first position where an approaching trolley will be directed into said track,
said first switch means including means for supporting said trolleys during passage through said upstream juncture point and being movable from said first to said second positions in repsonse to positioning of a trolley in said track loop, and second switch means movably mounted adjacent the downstream juncture between said track and track loop for supporting said trolleys during passage through said downstream juncture point, a first leading one of said trolleys moving into one of said track and loop and casusing a second trailing one of said trolleys to move along the other of said track and loop, said drive means engaging said second trolley when said first trolley is in one of said track and loop.

said loop intermediate portion being spaced from said track a distance allowing said second trolley to overrun said first trolley.

References Cited by the Examiner

UNITED STATES PATENTS

| | | | |
|---|---|---|---|
| 475,102 | 5/1892 | Wolfrom | 104—96 |
| 1,101,630 | 6/1914 | Hooper | 104—130 |
| 1,327,071 | 1/1920 | Taylor | 104—91 |
| 1,509,374 | 9/1924 | Nolan | 104—253 |
| 2,067,981 | 1/1937 | Ohlson | 104—96 |
| 2,949,862 | 8/1960 | Klamp | 104—88 |
| 2,975,727 | 3/1961 | Kokoros | 104—91 |
| 3,195,473 | 7/1965 | Dehne | 104—91 |

ARTHUR L. LA POINT, *Primary Examiner.*

F. W. MONAGHAN, *Assistant Examiner.*